J. T. BAGGS.
SAW MANDREL.

No. 178,502. Patented June 13, 1876.

Witnesses:
T. C. Rowles
Alfd. Callendine

Inventor:
James T. Baggs

UNITED STATES PATENT OFFICE.

JAMES T. BAGGS, OF BRIDGEPORT, OHIO.

IMPROVEMENT IN SAW-MANDRELS.

Specification forming part of Letters Patent No. 178,502, dated June 13, 1876; application filed May 20, 1875.

*To all whom it may concern:*

Be it known that I, JAMES T. BAGGS, of Bridgeport, in the county of Belmont, and State of Ohio, have invented certain Improvements in Saw-Mandrels, of which the following is a specification:

My invention relates to the combination of certain attachments with a saw-mandrel, so that the saw will be held to run in a plane perpendicular with the mandrel for ordinary sawing, or readily changed to different angles with the mandrel for cutting grooves and rabbets of different widths.

Figure 1:
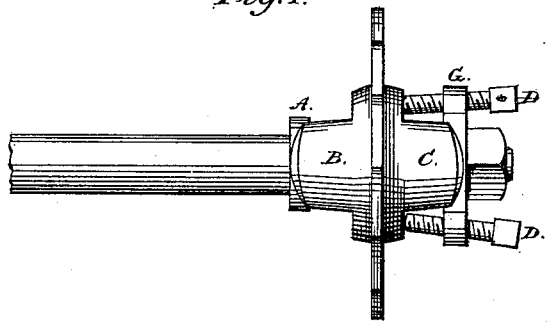
Figure 2:
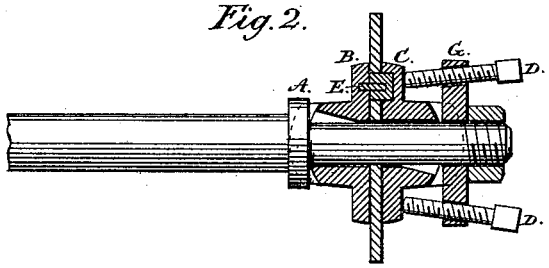
Figure 3:
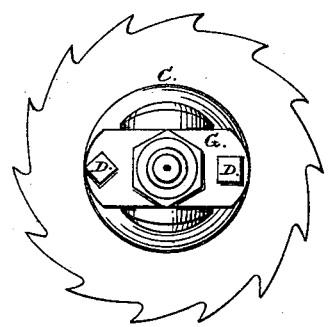

Figure 1 is a plan view of a device embodying my invention. Fig. 2 is a longitudinal section through the center of Fig. 1. Fig. 3 is an end view, looking at the right-hand end of Fig. 1.

Let A represent the solid or fixed collar of a saw-mandrel, against which the saw and its attachments are clamped by screwing up the nut on the end of the mandrel. The collars B and C are peculiarly shaped, of the same size and weight, so they will maintain a perfect balance at whatever angle they may be set.

The collar B has a pin, E, extending through a slot in the saw. A corresponding slot in the face of the collar C slides over the projecting end of pin E, so that when the saw is taken off for filing, and replaced, the teeth cutting the side walls of the groove will always come on the line of adjustment, said line passing through the center of set-screws D D.

By this simple arrangement the important advantage of truing the saw or its cutting-edge, when adjusted for cutting wide grooves, is attained, so that the bottoms of the grooves shall be straight, or conform to the shape formed on the cutting-edge by turning or otherwise; also, securing the advantage of dressing the side cutting-teeth, so as to plane the side walls of the grooves or rabbets, or cut the shoulders when used for cutting gains across the grain of the wood.

The collars B and C have parallel recesses formed in their outer ends, corresponding in width with plate G and fixed collar A. The outer ends of the extended jaws, also the bottoms of the recesses, are curved on a line extending to the center of the saw, with holes formed at right angles, the face of the collar on one side, and the opposite side of the holes widening from their inner ends outward.

The widened ends of the holes in the collars are arranged on opposite sides of the saw and mandrel, so that the straight sides of the holes in said collars may be held firmly in contact with the mandrel by means of the set-screws D D, and run true with a mandrel for ordinary sawing, or readily adjusted more or less oblique, by means of adjusting-screws D D, for cutting grooves, rabbets, &c., of various widths.

The plate G has a cylindrical hole fitting the mandrel, its outer edges also fitting closely between the extended jaws of collar C; and it is further provided with adjusting-screws D D, screwing through its outer ends and pressing against the flat places formed on collar C.

The mandrel is not abraded by this arrangement of adjusting-screws, (which is the case where they pass through the collar, curving against the mandrel,) avoiding trouble and loss of time in removing the collars and saw.

Another advantage is in having the pressure toward the fixed collars, clamping the collars and saw by the action of the adjusting-screws, so that the saw is always ready to start when the proper size is attained, avoiding the necessity of tightening the mandrel-nut.

The arrangement of the plate G and collar C is further made useful by setting out a scale on the edge of plate and the extended end of the collar, representing eighths or other fractional parts of an inch, the number of parts on the plate and collar being brought to coincide, denoting the size the saw will cut.

Having thus described my invention, what I claim as new, and desire to secure by Letters Patent, is set forth in the annexed claims.

I do not claim as new the angling of a saw for cutting wide grooves, for it has been done before by the use of wedges and other devices; but What I do claim as new and of my own invention is—

The graduating and adjusting plate G and adjusting-screws D D, in combination with the adjustable collars B and C, substantially as and for the purpose specified.

JAMES T. BAGGS.

Attest:
T. C. ROWLES,
ALF. L. CALLENDINE.